(No Model.)　　　　　　　　　　　　　　　　　7 Sheets—Sheet 1.

J. H. McCORMICK.
CASH REGISTER AND INDICATOR.

No. 570,141.　　　　　　　　　　　　Patented Oct. 27, 1896.

Fig. 1

WITNESSES:　　　　　　　　　　　　　　　INVENTOR
Chas. J. Welch　　　　　　　　　　　　　　John H. McCormick
Fred Ernst　　　　　　　　　　　　　　　　BY
　　　　　　　　　　　　　　　　　　　　　Staley & Shepherd
　　　　　　　　　　　　　　　　　　　　　ATTORNEYS (No Model.) 7 Sheets—Sheet 2.

J. H. McCORMICK.
CASH REGISTER AND INDICATOR.

No. 570,141. Patented Oct. 27, 1896.

*Fig. 2*

WITNESSES: Chas. I. Welch, Fred Ernest

INVENTOR John H. McCormick

BY Stanley Shepherd ATTORNEYS

(No Model.)

J. H. McCORMICK.
CASH REGISTER AND INDICATOR.

No. 570,141. Patented Oct. 27, 1896.

WITNESSES:
Chas. J. Welch
Fred Ernest

INVENTOR
John H. McCormick
BY
ATTORNEYS (No Model.) 7 Sheets—Sheet 6.

J. H. McCORMICK.
CASH REGISTER AND INDICATOR.

No. 570,141. Patented Oct. 27, 1896.

WITNESSES:
Chas. I. Welch
Fred Ernest

INVENTOR
John H. McCormick
BY
Story & Shepherd
ATTORNEYS (No Model.) 7 Sheets—Sheet 7.
J. H. McCORMICK.
CASH REGISTER AND INDICATOR.

No. 570,141. Patented Oct. 27, 1896.

Fig. 8

WITNESSES:
Chas. I. Welch
Fred Ernest

INVENTOR
John H. McCormick
BY
Staley & Shepherd
ATTORNEYS

UNITED STATES PATENT OFFICE.

JOHN H. McCORMICK, OF COLUMBUS, OHIO, ASSIGNOR TO HENRY S. HALLWOOD, OF SAME PLACE.

CASH REGISTER AND INDICATOR.

SPECIFICATION forming part of Letters Patent No. 570,141, dated October 27, 1896.

Application filed March 5, 1894. Serial No. 502,373. (No model.)

*To all whom it may concern:*

Be it known that I, JOHN H. MCCORMICK, a citizen of the United States, residing at Columbus, in the county of Franklin and State of Ohio, have invented certain new and useful Improvements in Cash-Registers, of which the following is a specification.

My invention relates to improvements in cash registers and indicators; and the object of my invention is to provide a machine in which various amounts of business transactions may be indicated and registered.

A further object of my invention is to provide a device in which the various amounts indicated and registered at different times will be added together, so as to show at any time the total amount registered.

A further object of my invention is to provide in a machine of this character mechanical devices by which various amounts in different departments may be registered separately.

A further object of my invention is to provide means by which the various amounts registered in separate departments may be combined together, so that the total amount of all the departments and of all the various transactions recorded on the machine will be shown at any time.

A further object of my invention is to simplify various constructions in the operative mechanism of cash registers and indicators.

A further object of my invention is to provide means by which any amount may be registered in any department by the use of a single keyboard.

I attain these objects in the manner illustrated in the accompanying drawings, in which—

Like parts are represented by similar letters of reference in the several views.

Figure 1:
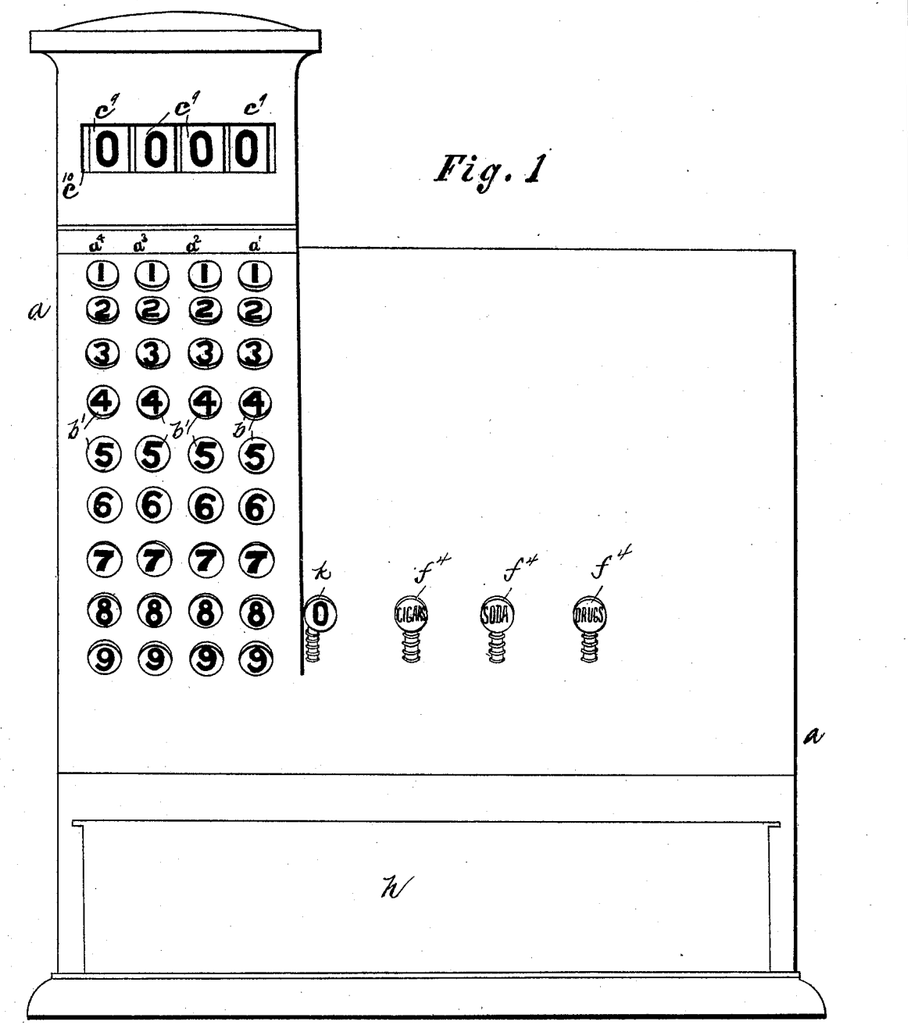
Figure 1 is a front elevation of a device embodying my invention.

In carrying out my invention I employ a keyboard in which the keys are arranged in sets or series, the respective keys in each set or series being numbered from "1" to "9," and the keys of the different sets or series being employed for registering different denominations, such as dollars, dimes, and cents. In the machine which I have illustrated I have shown four such sets of keys adapted, respectively, to register cents, dimes, dollars, and tens of dollars, the capacity of such a machine being such that a single amount of any denomination from one cent to ninety-nine dollars and ninety-nine cents can be registered. By the addition of other sets of keys provision may be made for registering a greater amount at a single operation. An indicating-wheel for each set of keys is provided, said wheels being numbered corresponding to the keys from "1" to "9" and being adapted to be revolved as the key is operated, so as to bring the number (corresponding to the key) opposite an opening in the upper part of the casing which incloses the mechanism. This part of the device is more fully described as follows:

The various sets of keys marked $a'$ $a^2$ $a^3$ $a^4$ are arranged at the front of the machine and near one side thereof, preferably on the left, as shown in Fig. 1. The various keys each consists of a short rod $b$, having on the end a knob or button $b'$, on which the number of the key is placed. The rods $b$ extend through suitable bearings $b^2$ in the frame $b^3$, which is supported stationarily in the casing $a\,a$, preferably from rods 1 and 2, which extend entirely across the main frame or casing $a\,a$. The frame $b^3$ is formed on its outer periphery on the arc of a circle, the casing being correspondingly curved at this point and adapted to fit snugly against the frame. The rear portion of the frame is formed on a different arc of a circle and eccentric to the front portion and is provided with a web or flange $b^4$, having a series of slotted openings $b^5$, one opening for each key. Each of the keys is provided with a laterally-projecting pin or stud $b^6$, which extends into the opening $b^5$, thus forming a guide for the key, which permits the key to move longitudinally within certain limits determined by the length of the slot and also prevents any rotary motion thereof. The key stems or rods are made of varying lengths, the shortest key being at the bottom and the longest key at the top of the series. In their normal positions the inner ends of the keys stand substantially opposite the inner edge of the web or flange $b^4$ and are held in position by a spring $b^7$, preferably placed around the rod $b$, as shown.

Figure 2:
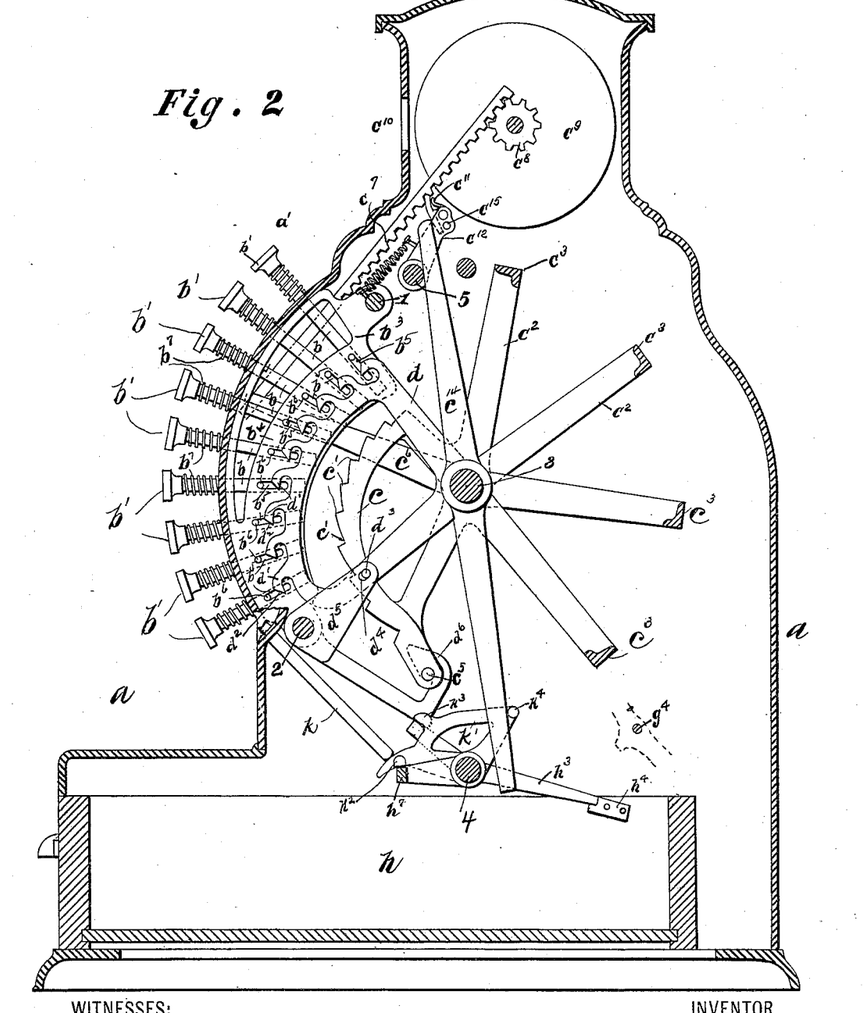
Fig. 2 is a transverse sectional elevation of the same, looking toward the keyboard.
Figure 4:
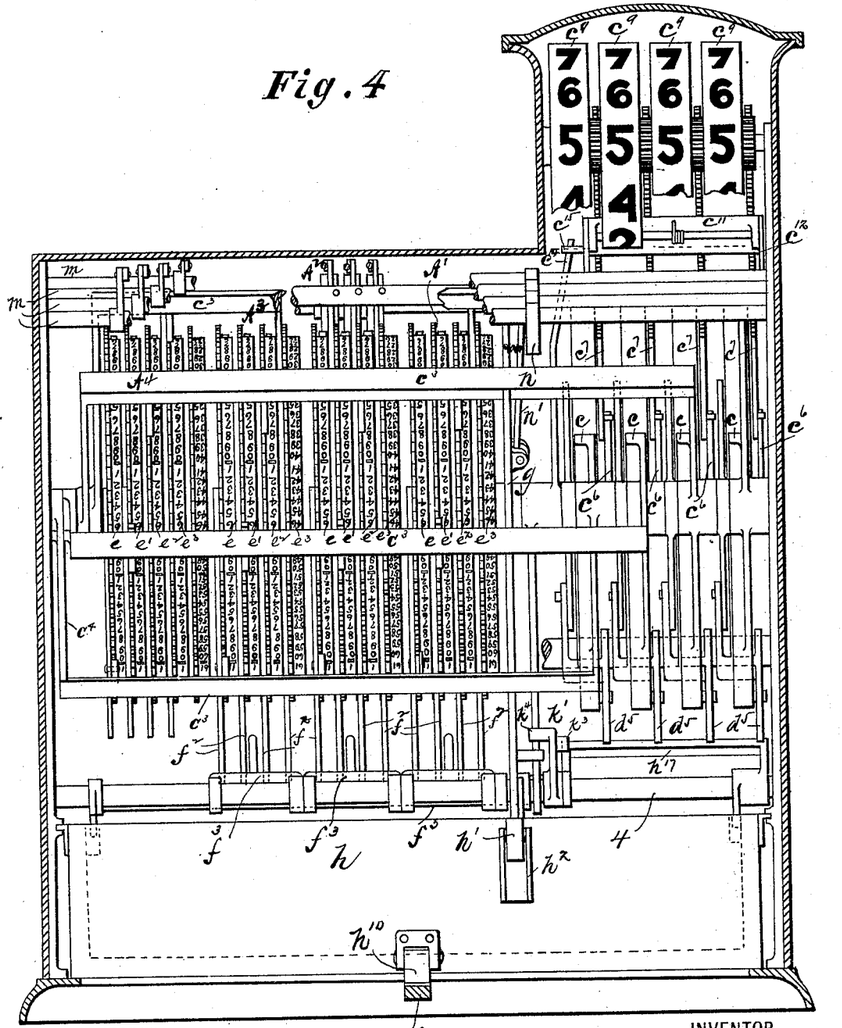
Fig. 4 is a rear elevation of the operating devices, the casing being shown in section and some of the parts broken away.

Located within the casing and opposite the respective keys of each series is a swinging frame $c$, hinged or pivoted on a central rod or shaft 3, which also preferably extends entirely through the casing or frame. This swinging frame $c$ is formed on the arc of a circle eccentric to the shaft 3, on which it turns, and is provided on its curved surface with a series of teeth or steps $c'$, adapted, as the frame is moved, to contact with the respective key-stems when the same are depressed, as will hereinafter more fully appear. Each of the frames $c$ is further provided with a projecting arm $c^2$, having at its outer end a bar $c^3$, which extends across all the registering devices in the machine, the frames $c$ opposite the keys representing different denominations having their arms $c^2$ arranged at different angles, as indicated in Fig. 2, so that each of said frames $c$ and the arms $c^2$ may move in the arc of a circle within certain predetermined limits without interfering with the movement of the other arm or its attached bar $c^3$. It should be stated that the respective bars $c^3$ each is provided at its opposite end with an arm or lever $c^4$, which extends inwardly and is journaled on the shaft 3, as shown in Fig. 4.

Figure 5:
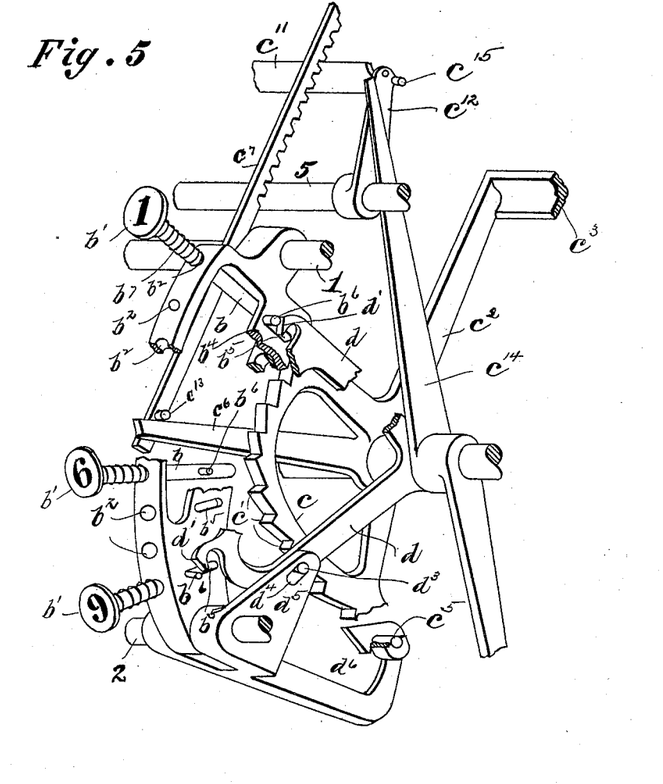
Fig. 5 is a detail view in perspective of a portion of the keyboard and some of the operating devices connected with the registering-keys.

Lying adjacent to the frame $c$ and also hinged to the shaft 3 is a segment $d$, the outer periphery of which is formed on the arc of a circle also eccentric to the shaft 3, but concentric to the frame $b^3$. The outer periphery of this segment is provided with a series of hook-shaped teeth $d'$, having beveled ends $d^2$, which normally stand opposite the slots $b^5$ in the frame $b^3$ and in line with the projecting pins $b^6$ on the stems $b$. The segment $d$ is further provided with a projecting stud or pin $d^3$, which engages in a slotted opening $d^4$ in one arm of a bell-crank lever $d^5$, pivoted on the rod 2, the other arms of said bell-crank lever being formed into a hook $d^6$, adapted to engage over a stud or pin $c^5$ on the frame $c$. (See Fig. 5.)

When a key is depressed in any series, the pin $b^6$, contacting with the beveled end $d^2$ of the hook $d'$, causes the segment $d$ to turn on its pivotal center, and thus rocks the bell-crank $d^5$, so as to raise the hook $d^6$ from the pin $c^5$, and thus releasing the frame $c$. At the same time the key is brought in line with the segment $d$, so that as it turns on its pivotal center one of the steps $c'$ of the frame $c$ contacts with the pin, and thus limits the movement of said frame. As the key is pressed downwardly to the limit of its stroke the segment $d$ returns in the opposite direction to that which it was moved, and, inasmuch as the hook $d^6$ has been disengaged from the stud or pin $c^5$, the segment is permitted a greater movement in the backward direction than was given it in the forward direction, so that the respective hooks $d'$ come across the respective slots $b^5$, and thus prevent any key from being operated. The key which is depressed is engaged and held in the depressed position by the inner side of the hook, while the keys not depressed are held against any inward movement by the outside of the respective hooks which stand opposite the same.

It should be stated that each of the swinging frames $c$ is further provided with an outwardly-extending arm $c^6$, connected at its outer end to a rack $c^7$, which engages with a pinion $c^8$ on the indicator-wheel $c^9$. As the frame $c$ moves about the shaft 3 a corresponding movement is imparted to the indicator-wheels $c^9$.

It should be stated that the different steps or teeth $c'$ in the frame $c$ are so arranged that the movements of the frame necessary to contact with the first key represents one unit, while the movement necessary to contact with the last key represents nine units, each intermediate key being adapted to permit of a movement one unit greater than the preceding key. The complete movement of the frame $c$ is adapted to produce nine-tenths of a revolution of the indicator-wheel $c^9$. The shortest movement of the frame $c$ is adapted to produce one-tenth of a revolution of said wheel, so that the numbers on said wheel from "1" to "9" are brought opposite the opening $c^{10}$ in the casing to correspond with the key which is depressed.

Figure 3:
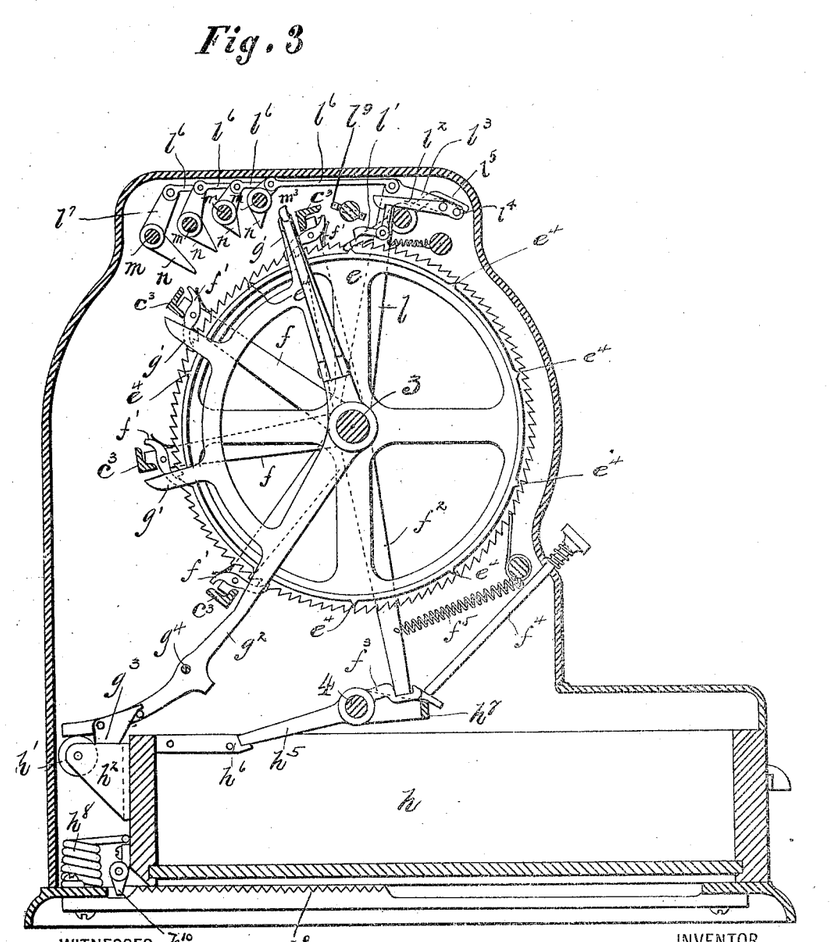
Fig. 3 is a similar sectional elevation looking in the opposite direction.

For the registering mechanism I employ a set of registering-wheels for each department which is to be kept separate, and in each set of wheels I provide one wheel for each denomination which is represented on the keyboard. In addition to these I provide a set of wheels independent of each department, but adapted to register the combined amounts registered on all the departments. In the present machine I have illustrated registering devices for three departments $A'$, $A^2$, and $A^3$, the registering-wheels for the total amount being shown at $A^4$. The registering-wheels are shown at $e$, $e'$, $e^2$, and $e^3$. Each of these wheels, representing cents, dimes, and dollars, is numbered in series of ten from "0" to "9," respectively, while those representing tens of dollars are numbered from "0" to "99." All the registering-wheels in all the departments and for all denominations are journaled on the central shaft 3. (See Figs. 3 and 4.)

Journaled on the shaft 3 at the side of each registering-wheel is a pawl-carrying arm $f$, having at its outer extremity a pivoted pawl $f'$, adapted to engage in the teeth of the wheel to which it belongs. This arm is further provided with a projecting finger $f^2$, which is normally engaged by a pivot-latch $f^3$, journaled on the shaft or rod 4. The fingers $f^2$ of the respective arms $f$ belonging to each department, when in their normal position, stand in line and are all engaged by the same latch $f^3$. (See Figs. 3 and 4.) The arms $f$, however, for each of the wheels in each department stand at different angles corresponding to the arms $c^2$ on the frame $c$, the construction being such that the end of each arm $f$ rests in contact with the bar $c^3$ connected to each of the arms $c^2$. As each of the bars $c^3$ therefore is released and turns about the shaft 3 the arms $f$, which contact with said bars, are also released, so far as the support of said bars is concerned. These arms $f$, however, are still retained in their positions by the latch $f^3$ corresponding to the department to which said arms belong.

Arranged opposite to each of the latches $f^3$ is a key $f^4$, which extends through the casing in reach of the operator and is adapted when depressed to contact with the latch $f^3$, so as to disengage the arm or finger $f^2$. When so depressed, the pawl-lever $f$ belonging to each register-wheel in that department is released, and each one of said arms which remains unsupported by a bar $c^3$ is moved by a spring $f^5$ and carries its registering-wheel a number of notches corresponding to the units which the bar $c^3$ has been permitted to move by the movement of the frame $c$ prior to its contact with the key which has been depressed. It will be understood that all those registering-wheels which belong to the departments other than the one operated will be retained in their position by the pivoted latch $f^3$ of that department. The arms $f^2$ belonging to the total-adding wheels (shown at $A^4$) are not encumbered by any latch of this character, so that the pawl-levers for those wheels drop when the bars $c^3$ drop, so that if the bar $c^3$ corresponding to any series of keys is released the pawl-lever of the registering-wheels corresponding to said series in the total department moves with it, so that a registration in the total department takes place every time the keys are depressed, while a registration in the other departments takes place only when the department-key is pressed.

Arranged at any convenient point in the length of the shaft 3 and pivoted on said shaft is an intermediate supporting device $g$, having projecting fingers $g'$, which normally stand immediately under the respective bars $c^3$ and temporarily support the same when they are released by the action of depressing a key, as before described. The distance which each of the bars moves prior to contacting with the respective fingers is sufficient to produce the movement of the locking device $d$ heretofore described. This auxiliary support is normally held in the proper position to accomplish this result by an extended arm of finger $g^2$, which is operated by the opening and closing of the cash-receptacle $h$. In the present machine this is illustrated as resting directly in contact with a friction-roller $h'$, journaled in a suitable bearing $h^2$, connected with the cash-receptacle, which is in the form of a sliding drawer.

The cash-drawer $h$ is normally locked by two independent locking devices, one of which is operated by the operation of any key in any series and the other by the operation of a key which releases a department registering device. The locking device connected to the keys is shown in Fig. 2 and consists of a lever $h^3$, normally resting in contact with a projection $h^4$ on the drawer and journaled on the rod or shaft 4, the opposite extremity of said lever having a laterally-projecting bar $h^{17}$, which rests in contact with the bell-crank levers $d^5$, so that the return movement of either of said bell-crank levers, which takes place immediately after the segment $c$ has been released, also operates the lever $h^3$ and releases the drawer at this point, the lever $h^3$ being retained in this position so long as the key remains depressed. A similar locking-lever $h^5$, adapted to engage a projection $h^6$, is pivoted on the shaft 4 at a different point and adapted to be operated whenever one of the latches $f^3$ is depressed by a department-key. The locking-lever $h^5$ is connected to a U-shaped piece $h^7$, which extends for some distance parallel with the shaft 4, the respective ends of this piece being pivoted to said shaft. This U-shaped piece $h^7$ is connected to the lever $h^5$ and extends under all the latches $f^3$ in all the departments, and also contacts with a part of what I term the "zero" device, and which will be referred to more specifically hereinafter. The result of the construction above described is that the drawer is partially unlocked by the depressing of any key in any series. The depressing of a department-key completes the operation of unlocking the drawer, and the same is opened by means of a spring $h^8$. As the drawer is opened the arm $g^2$ drops, and with it the bars $c^3$ and the respective pawl-levers $f$, or so many thereof as have been released by the operation of a key in the series to which said bar corresponds. A registration therefore takes place on the registering-wheels corresponding to the series in which the key is depressed, the registration being effected both in the department which has been operated and on the total-adding device.

When the drawer is closed, the parts are all returned to their normal positions. This is principally accomplished through the agency of the intermediate supporting device $g$, and to accomplish this it is necessary that this device be moved to a position slightly in advance of that which it occupies normally. To effect this, I provide on the extended finger $g^2$ a pivoted cam portion $g^3$, adapted as the drawer moves outwardly to be raised out of the way, but adapted as the drawer moves inwardly to contact with the roller $h'$, and thus move the said finger beyond its normal position, permitting it to drop back to the normal after the roller has passed the pivoted cam. The result of this operation is that all of the bars $c^3$ which have been released are carried back to their normal positions. The segments attached to said bars are also moved correspondingly until the pin $c^5$ of each is engaged in a beveled portion of the hook $d^6$, thus moving the bell-cranks $d^5$, which in turn move the frame-pieces $d$ and release the lever $h^3$. The result is that the keys are all unlocked and the locking-lever $h^3$ permitted to again contact with the projection $h^4$. The locking-lever $h^5$ returns to its normal position as soon as the department-key which operates the same is released, so that it falls into the locking position as soon as the drawer is closed and the parts are again in their normal positions.

Means are provided by which the indicating-wheels remain in the position assumed in the last registration until a succeeding opening of the drawer. This is accomplished by providing a pivoted retaining-bar $c^{11}$, which extends across and engages with the teeth of the respective racks $c^7$. This retaining-bar $c^{11}$ is pivoted at each end in swinging arms $c^{12}$, which are journaled on a frame-shaft 5. (See Fig. 5.) As the racks $c^7$ or either of them are moved upwardly to indicate any amount the swinging bar $c^{11}$ is turned to a position substantially parallel with the racks, and thus releases those racks which have been previously engaged, allowing them to return to their normal positions. This movement of the racks $c^7$ independent of the segments is permitted by providing the racks $c^7$ with a pin $c^{13}$, which forms the connection between the racks $c^7$ and arms $c^6$ when the parts are moving together, as before described. The segment and arm, however, are permitted to drop back, while the rack remains in this position by engagement with the swinging arm $c^{11}$. To insure the proper engagement of the swinging bar $c^{11}$ with the racks when they have reached their proper position, I provide a swinging lever $c^{14}$, pivoted on the shaft 3 and adapted at one end to contact with a pin $c^{15}$ on one of the swinging arms $c^{12}$, which supports the pivoted bar $c^{11}$. A laterally-projecting pin $g^4$ on the finger $g^2$ is adapted, as said finger drops upon the opening of the drawer, to contact with the opposite end of the swinging lever $c^{14}$, which causes said lever to move into contact with the pin $c^{15}$, and thus carries the swinging arm $c^{12}$ and the pivoted bar $c^{11}$ away from the racks, so as to allow said bar to assume a position substantially at right angles to said racks and thus engage the teeth thereof.

To provide for opening the drawer for making change or for similar purposes when no registration is to take place, I provide a key adapted to operate both of the drawer-locking levers and connect the same and at the same time to act through the zero devices to return all the indicating-wheels to zero. The key for producing this result is shown in Fig. 2 at $k$, the stem thereof resting in contact with a triangular-shaped piece $k'$, which is hinged or pivoted on the shaft 4. This piece $k'$ is provided with projections $k^2$, $k^3$, and $k^4$, adapted to engage, respectively, with the U-shaped piece $h^7$, the lateral bar $h^{17}$ of the locking-lever $h^3$, and the pivoted lever $c^{14}$. By pressing on the key $k$, therefore, each of the said parts is operated. The operation of the locking-levers $h^3$ and $h^5$ opens the drawer. The movement of the hinged lever $c^{14}$ carries the upper end of said lever in contact with the pin $c^{15}$, which moves the hinged arm $c^{12}$ sufficient to entirely disengage the swinging bar $c^{11}$ from the teeth of the respective racks, thus permitting said racks to all return to their normal position and bringing all the indicating-wheels to zero.

Figure 7:
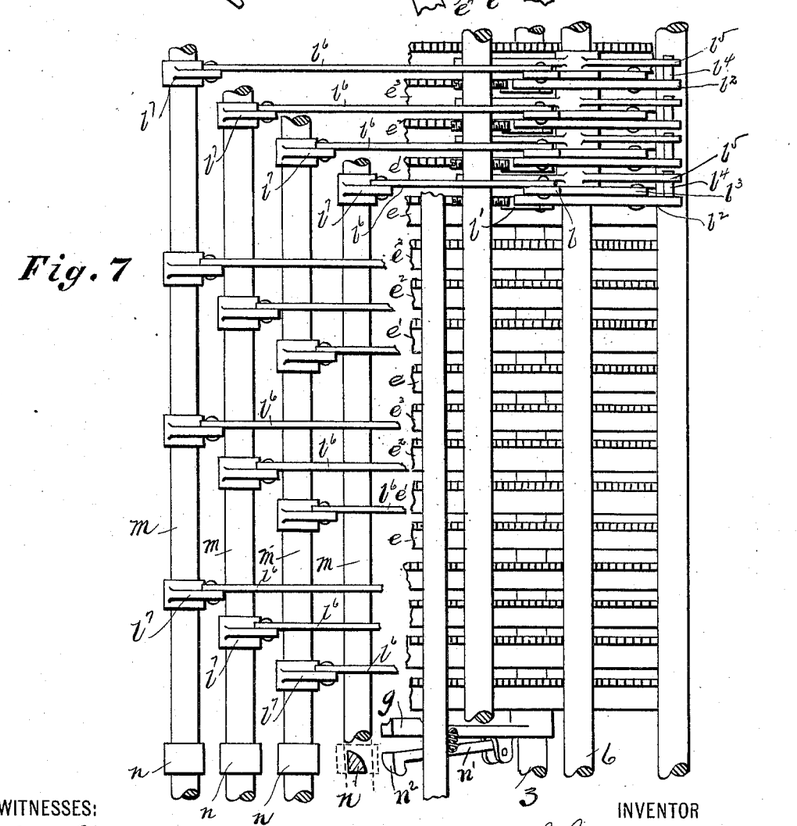
Figure 8:
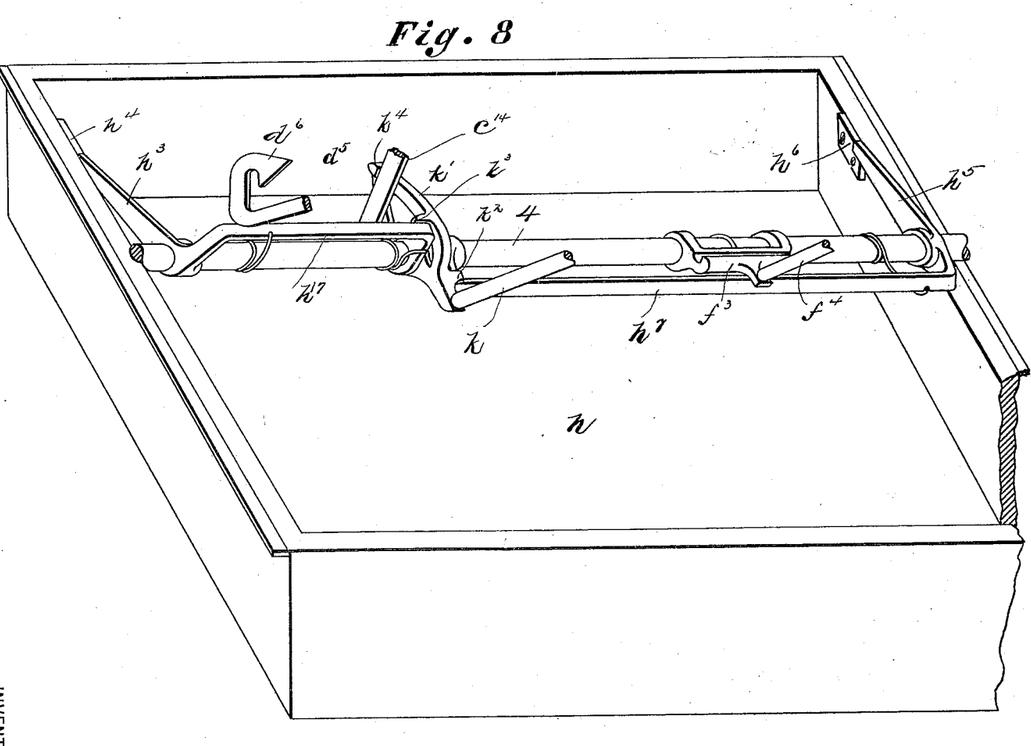
Fig. 8 is a perspective view of the cash-receptacle and some of the parts operating in connection therewith.

Means are provided by which when units are registered on one wheel sufficient to make a unit of the next higher denomination the wheel representing the next higher denomination is moved forward one notch. In accomplishing this I provide a separate auxiliary device adapted to be operated by the closing of the cash-receptacle and after all the registering devices have finished their ordinary operation of registering. Each of the registering-wheels in each series except the registering-wheel representing the highest denomination has a series of teeth or projections $e^4$, these teeth or projections being ten in number arranged around the peripheries of the wheels at one side of the registering-teeth and separated from each other by a distance corresponding to ten of said registering-teeth. Adjacent to each of the registering-wheels except the registering-wheel of the lowest denomination is a hinged lever $l$, pivoted on the central supporting-shaft 3. Each of these levers carries at its outer end a pivoted pawl $l'$, adapted to engage with the registering-teeth of the wheel to which it belongs. The pawl $l'$ is formed in the nature of a bell-crank, one arm thereof being adapted to engage the registering-teeth, the opposite arm being engaged by a pivoted latch $l^2$, supported on the arm $l$, said arm being provided with a backwardly-projecting portion $l^3$ for this purpose. The pivoted latch $l^2$ projects beyond the extension $l^3$ and is provided with a laterally-extending pin or projection $l^4$, which lies adjacent to and under a projecting finger $l^5$, formed on a pivoted pawl $l^8$, which lies adjacent to and in line with the respective teeth $e^4$ on the registering-wheel of the next lower denomination. All these pawls $l^8$ are pivoted on a shaft 6, which extends through the frame of the machine. Each of the levers $l$ is connected by a link $l^6$ to an arm $l^7$, arranged on one of a series of shafts or rods $m\ m'\ m^2\ m^3$, these shafts $m\ m'\ m^2\ m^3$ corresponding, respectively, to the wheels representing cents, dimes, dollars, and tens of dollars. Each of said shafts is further provided with a projecting finger $n$, which is arranged in line with a spring-arm $n'$, connected to the auxiliary supporting device $g$. This arm $n'$ is provided at its outer extremity with a lateral projection $n^2$, beveled on one side, the finger $n$ being correspondingly beveled in the opposite direction, as shown in Fig. 7, the construction being such that as the supporting device $g$ is moved by the opening of the drawer these projecting devices pass each other by the swinging of the arm $n'$.

Figure 6:
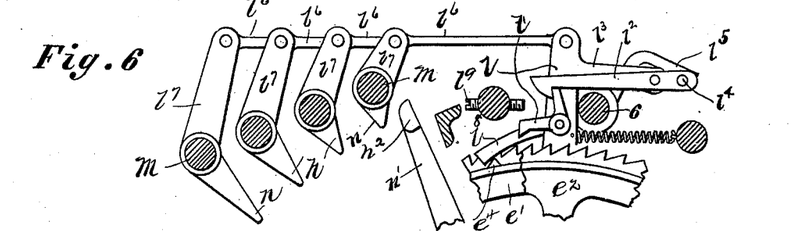
Figs. 6 and 7 are detail views of the transferring mechanism by which amounts of one denomination are transferred to a higher denomination.

When the arm is moved in the opposite direction, however, by the closing of the drawer, the arm contacts successively with the respective fingers $n$ on the shafts $m\ m'\ m^2\ m^3$, and thus rocks said shafts and produces a slight vibrating movement of each of the levers $l$ connected to said shafts. Now as a registering-wheel is carried forward sufficiently to bring a tooth $e^4$ in contact with a pivoted pawl-lever $l^8$, the extension $l^5$ on said pawl-lever is brought in contact with the pin $l^4$, so as to raise the latch $l^2$, thus releasing the pawl $l'$, which engages with the registering-teeth of the wheel to which it belongs, so that whenever the pawl $l'$ is in engagement with the registering-wheel as the cash-receptacle is closed that wheel is moved forward one notch, when it contacts with a screw-threaded stud $l^9$ on the shaft 5, which raises the pawl $l'$ until it is reëngaged by the latch $l^2$. (See Figs. 3 and 6.) Inasmuch as the pawl $l'$ can be released only when the registering-wheel of the lower denomination has moved ten units, the adding or transferring from one denomination can only take place when the proper registration has been made on the preceding registering-wheel.

Means are provided by which the cash-receptacle $h$, when released, must be opened to a certain predetermined point before it can be closed, and must be entirely closed before it can be again opened. This is accomplished by providing below the cash-drawer a series of teeth $h^9$, adapted to be engaged by a pivoted pawl $h^{10}$, hinged to the drawer. A space at either end of the teeth permits the pawl to reverse, so as to engage the teeth in the opposite direction as it passes beyond the series of teeth in either direction.

It will be seen from the above description that a machine is provided in which a registration in any department desired may be secured from the operation of a single series of keys. The construction is such that no registration can take place unless one of the departments is operated at the same time the total amount of all the registrations in all the departments is registered on the total-adding device.

Having now fully described my invention, what I claim, and desire to secure by Letters Patent, is—

1. In a cash-register, a series of department registering devices each consisting of registering-wheels of different denominations, actuating-levers, one for each wheel pivoted concentric with said wheels, actuating-bars extending across the entire series of wheels so as to contact with said levers, a keyboard having denominational keys adapted to control the movement of said bars, locking means for holding the actuating-levers of each department, and special keys for operating said locking means, substantially as specified.

2. In a cash-register, a series of registering-wheels journaled in line with each other, said wheels being arranged in sets, an actuating device for each wheel of each set and means for normally locking said actuating devices, actuating-bars extending across the entire set of wheels and pivoted concentric therewith, cash-keys for releasing and determining the movement of said bars a connection from said bars to the actuating devices of the respective wheels and special keys for unlocking the said actuating devices, substantially as specified.

3. In a cash-register, cash-keys and registering devices, said registering devices being grouped into departments, each department comprising wheels of different denominations, actuating devices comprising hinged or pivoted bars concentric with said wheels and common to all the groups for operating the registering-wheels, one bar for each denomination, a total-adding register independent of the department-registers but actuated by the common actuating devices, and means for releasing the department-registering devices to cause one or more of them to operate in unison with the total-adding register, substantially as specified.

4. A cash-register, cash-keys arranged in series, each key of each series being adapted to release and determine the movement of a pivoted actuating-bar, registering-wheels of different denominations arranged concentric with said actuating-bar having pawl-levers to contact with and be moved by said bar, an intermediate supporting device for said actuating-bar, and a movable cash-receptacle, said supporting device being connected to and adapted to be operated by the opening and closing of said receptacle, substantially as specified.

5. In a cash-register a series of keys arranged on the arc of a circle as described, a swinging segment pivoted eccentrically on a shaft adjacent to said keys, said keys being of different lengths and adapted to be moved in line with said segment, means for limiting the movement of said keys and a series of steps on said segment to contact with the respective keys, substantially as specified.

6. In a cash-register a series of keys arranged on the arc of a circle as described, said keys having stems of varying lengths adapted to be moved so as to stand in line with a swinging segment having a series of teeth or steps thereon, means connected with said segment for determining the movement of registering devices and an engaging plate for holding the respective keys in their respective positions when one key is depressed, substantially as specified.

7. In a cash-register a series of keys and a series of registering devices each of said registering devices being adapted to register the amount indicated by said keys, means for normally holding the registering devices in an inoperative position, a normally-closed cash-receptacle and a locking device for said cash-receptacle adapted to be operated by the operation of a key, means for releasing the actuating devices of said registering mechanism and at the same time operating an additional locking device to said drawer whereby the drawer is held in a locked position until one of the registering devices is brought into position for operation, substantially as specified.

8. A series of cash-keys, and indicating devices connected thereto, an actuating device for each set of keys adapted to be released and controlled when one key of said series is depressed, a series of registering devices arranged in groups and each adapted to be operated by the common actuating device, locking means for retaining said registering devices in a normally inactive position, a total-adding register normally connected to said actuating device and independent of said normally inactive registers, and special keys for releasing said normally inactive registering devices to cause one or more of them to operate in unison with the total-adding device by the operation of said actuating devices or any one of them, substantially as specified.

9. Cash-keys arranged in series, each series corresponding to a different denomination, each key of said series representing a unit of said denomination, an actuating device for each denomination adapted to be released when any key of its series is depressed, registering devices arranged in groups, each group comprising registering-wheels representing denominations corresponding to the denominations of the actuating devices, locking means for retaining said registering devices in a normally inactive position, and a releasing device for each set of registering devices, a total-adding registering device comprising registering-wheels similar to the normally inactive registering devices, and normally connected to said actuating devices, and means, substantially as described, for releasing any group of registering devices to cause it to operate in unison with said total-adding device, substantially as specified.

10. A series of cash-keys having straight stems of different lengths, a swinging segment pivoted eccentrically on a shaft adjacent to said keys, and an actuating-bar connected to said segment, registering-wheels journaled in line with the center of said swinging segment, said registering-wheels being arranged in groups or sets, and connecting devices between said actuating-bar and one of said registering-wheels, locking means for holding said registering devices in a normally inactive position, and special keys for operating said locking means to cause said registering-wheels to be operated by the actuating-bar when a cash-key is depressed, substantially as specified.

11. A curved keyboard, cash-keys arranged in sets on said board, each set representing a different denomination and each key representing a unit of that denomination, a swinging segment eccentrically pivoted on a shaft adjacent to said keys, said keys each having a stem of different length communicating with said segment, a series of registering-wheels journaled in line with the center of said segment, and an actuating-bar on said segment extending across the faces of said wheels, and moving concentrically therewith, and connections between said actuating-bar and the registering-wheels corresponding thereto whereby said wheels are moved by said actuating-bar when one or more keys are depressed, substantially as specified.

12. In a cash-register, a series of keys having stems of different lengths, and an eccentrically-arranged segment having steps to contact with said key-stems, an actuating-bar connected to said segment, and registering-wheels arranged in different sets connected to said bar, and an indicating-wheel connected to said segment adapted to indicate the position of said actuating-bar, substantially as specified.

13. A series of cash-keys, and a series of registering-wheels, an actuating-bar extending across said wheels and controlled by said keys to determine the movement of said registering-wheels, an intermediate support for said actuating device operated by the opening and closing of a cash-receptacle, transferring mechanism to carry amounts from one registering-wheel to those of a higher denomination, and means, as described, connected with said support to operate said transferring mechanism when said support is returned to its normal position, substantially as specified.

14. In a cash-register, a series of cash-keys and a series of registering-wheels, actuating-bars extending across said wheels and controlled by said cash-keys connected to said wheels, said registering-wheels representing units of different denominations, and transferring mechanism for conveying amounts from one wheel to the wheel of the next higher denomination, a supporting device actuated by the opening and closing of a cash-receptacle and adapted to normally support said actuating devices, and means connected with said support to operate said transferring mechanism as the cash-receptacle is closed, substantially as specified.

15. In a cash-register, a normally-closed cash-receptacle having two independent locking devices therefor, a series of keys each adapted to operate one of said unlocking devices and at the same time set in operation an indicator to indicate the amount represented by said key, a department-key for releasing the registering devices of a certain group or set adapted to operate the unlocking device, and a connecting mechanism adapted to be moved by an independent operating-key to simultaneously move both of said locking devices and means as described for releasing said indicator to permit the same to return to zero when said locking devices are simultaneously operated, substantially as specified.

16. In a cash-register a normally-closed cash-receptacle having two independent locking devices each adapted to be operated by a separate mechanism essential to the operation of the registering devices and a separate independent drawer-opening device adapted to simultaneously operate both of said locking devices without affecting the registering devices, substantially as specified.

17. In a registering device a series of keys and a series of actuating devices, an auxiliary support for said actuating devices normally detained by a movable cash-receptacle, said support being held normally slightly removed from said actuating devices to permit an independent movement thereof when released by said keys, said support being adapted to return said actuating devices to their normal positions when the cash-receptacle is closed and means as described for permitting a limited backward movement of said support after the actuating devices have been returned to their normal positions, substantially as specified.

18. In a cash-register the combination with a series of registering-keys and an intermediate actuating device, a series of indicating-wheels each having a rack and pinion the respective racks being adapted to be operated by the actuating devices, a pivoted bar journaled in spring-actuated hinged arms adapted to engage in the teeth of all of said racks, said bar being adapted to be moved into a plane parallel with said racks and thus release all of said racks when one of said racks is moved in a forward direction and means as described for reversing the position of said bar causing it to retain the rack so elevated when the same reaches the limit of its forward movement, substantially as specified.

19. A series of keys and a series of actuating devices connecting said keys and a series of indicating-wheels for each set of keys, a rack and pinion connected to each of said indicating-wheels adapted to be operated by one of said actuating devices, a pivoted bar journaled in spring-actuated arms and adapted to engage the teeth of all of said racks, said bar being moved into a plane parallel with the racks so as to disengage the teeth thereof whenever one rack is moved in a forward direction, means for reversing said bar to cause it to engage said racks when the cash-receptacle is opened and means as described for releasing all of said racks by the depression of an independent operating-key, substantially as specified.

20. In a cash-register, a keyboard formed on the arc of a circle having a series of keys with stems of different lengths, and lateral projections on each of said key-stems, a frame having bearings for said key-stems, and a pivoted frame adjacent thereto, said frame being formed eccentric to the keyboard and provided on its periphery with hooks having beveled ends, as described, said hooks being adapted to stand opposite the lateral projections so as to engage the same as the keys are depressed, and an eccentrically-arranged contacting device adjacent to said keys adapted when released to engage the depressed keys, substantially as specified.

21. In a cash-register, the combination with a series of cash-keys having stems of different lengths and arranged on the arc of a circle, an eccentrically-arranged web or flange adjacent to said key-stems, and a series of slotted openings on said flange, one for each key, laterally-extending projections on said key-stems projecting through said slotted openings, and an eccentrically-arranged pivoted frame adjacent to said flange, having on its periphery hook-shaped projections with beveled ends to engage said key projections, substantially as specified.

22. In a cash-register, a normally-locked cash-receptacle, and a normally inactive registering mechanism, a series of keys adapted when depressed to determine the movement of said registering mechanism, a pivoted frame having hook-shaped projections adapted to engage laterally-extending projections on said key-stems when said keys are depressed, a normally-locked intermediate actuating device adapted when released to contact with said key-stems, a connection from said movable frame to the locking devices of said cash-receptacle and said intermediate actuating device, respectively, whereby a movement of said frame to lock the keys unlocks the cash-receptacle and the intermediate actuating devices, substantially as specified.

23. In a cash-register, a series of cash-keys, a normally-locked cash-receptacle, and a normally inactive registering mechanism, an intermediate actuating device adapted when released to contact with said keys and determine the movement of said registering mechanism, a movable frame having beveled projections to engage with said keys, and means connected with said movable frame for simultaneously unlocking said intermediate actuating device and said cash-receptacle, substantially as specified.

24. The combination with a series of indicating-wheels, and a rack and pinion for each of said wheels, a pivoted bar common to all of said racks and adapted to engage with the teeth of the same, said bar being journaled at each end in swinging arms to permit it to lie parallel with or at an angle to said racks, a movable cash-receptacle and means connected therewith for moving said swinging arms when the cash-receptacle is opened to cause the pivoted bar to engage with each of said racks, substantially as specified.

25. The combination with the indicating-wheels and their operating-racks, of a pivoted bar extending across said racks and common to all of the same, said bar being journaled in swinging arms as described, a normally inactive registering mechanism, and a connection from said registering mechanism to each of said racks, and means, substantially as described for operating the swinging arms to cause said pivoted bar to engage with each of said racks when the registering mechanism is set into operation, substantially as specified.

26. The combination with a series of keys having stems of different lengths, as described, and a swinging segment having a series of teeth or steps adapted to contact with said keys, register-operating mechanism connected to said segment, a locking-plate arranged adjacent to said keys adapted to engage with the projections thereon, a bell-crank lever connected to said locking-plate, a normally-locked cash-receptacle, and means, substantially as described, for unlocking said cash-receptacle and said segment by the operation of said bell-crank lever, substantially as specified.

27. In a cash-register, a normally inactive registering mechanism comprising a series of wheels and concentric pivoted actuating-bars extending across said wheels, cash-keys for determining the movement of said bars when released, and an intermediate support for said bars actuated by the opening and closing of a cash-receptacle, transferring mechanism adapted to be set by but actuated independent of said registering mechanism, means connected with said bars for actuating the registering devices when the intermediate support is moved in one direction, and means connected with said support for operating the transferring mechanism when the intermediate support is moved in one direction, and means connected with said intermediate support for operating the transferring mechanism when said support is moved in the opposite direction, substantially as specified.

28. In a registering mechanism comprising two wheels representing units of different denominations, one of said wheels having a series of projections arranged at intervals corresponding to the unit of the next higher denomination, a lever pivoted concentric to said wheels and carrying a pawl, and a latch for said pawl, an arm connected to said latch and adapted to engage the projections on the wheel of lower denomination, said pawl being normally held by said latch out of engagement with but in line with the teeth of the wheel of the higher denomination, means for producing a limited movement of said pivoted lever after each movement of said registering-wheels, said pawl being adapted to engage the teeth of the wheel of the higher denomination if released by said latch but not otherwise, substantially as specified.

29. In a cash-register, a normally-closed cash-receptacle, normally-locked registering devices and special keys for unlocking the same, cash-keys for controlling the movement of said registering devices when unlocked, independent locking devices for the cash-receptacle connected to said cash-keys and said special keys, respectively, whereby the operation of a special key and a cash-key is made essential to the opening of the cash-receptacle in connection with a registration, and an independent drawer-key adapted to simultaneously operate both of said locking devices without affecting the registering devices, substantially as specified.

30. A cash-register having a series of normally inactive registering devices, and cash-keys for determining the movement of the same, special keys for releasing said registering devices, a normally-closed cash-receptacle having independent locking devices, one of said devices being connected to said cash-keys and the other to said special keys whereby the opening of the cash-receptacle by the single operation of either a cash-key or a special key is prevented, substantially as specified.

In testimony whereof I have hereunto set my hand this 2d day of March, A. D. 1894.

JOHN H. McCORMICK.

Witnesses:
C. C. SHEPHERD,
F. A. SIEGEL.